United States Patent Office 3,388,174
Patented June 11, 1968

3,388,174
PROCESS FOR MAKING FLUOROCHLOROBENZENES AND HEXAFLUOROBENZENE
Harold Crosbie Fielding and Frank Nyman, Northwich, England, assignors to Imperial Chemical Industries Limited, London, England, a corporation of Great Britain
No Drawing. Filed Sept. 10, 1964, Ser. No. 395,549
Claims priority, application Great Britain, Oct. 3, 1963, 38,976/63
6 Claims. (Cl. 260—650)

This invention relates to a process for making fluorochlorobenzenes, particularly those containing four and five fluorine atoms in the molecule, and for making hexafluorobenzene.

When hexachlorobenzene is heated with a dry alkali metal fluoride in a polar, non-proton-donating liquid organic medium, for example with potassium fluoride in tetramethylene sulphone, dimethyl sulphoxide, dimethyl formamide, dimethyl acetamide, or molten phthalic anhydride, good yields of trifluorotrichlorobenzene are obtained as described in our U.S. patent application S.N. 282,597, now abandoned. Yields of more fluorinated compounds namely tetrafluorodichlorobenzene, pentafluorochlorobenzene and hexafluorobenzene are however lower, in that order, and the times required to obtain them are longer. The principal reason for this is that the boiling points of these more fluorinated compounds are below the temperature at which the fluorination reaction takes place at atmospheric pressure. Consequently, as soon as any one of them is formed it begins to leave the reaction mixture and even when returned to it by reflux does not remain in contact with the alkali metal fluoride in the reaction mixture long enough and closely enough for further fluorination to be achieved in reasonable time. Return of the refluxing fluorochlorobenzenes to the reaction system tends to lower the temperature of the latter, and this is an additional obstacle to further fluorination.

Comparison of the boiling points of some of these compounds with the temperatures suitable for the reaction will illustrate the problem. Thus whilst a suitable temperature is from 150° C. to 250° C., preferably 200° C. to 230° C. trifluorotrichlorobenzene boils at 196° C., tetrafluorodichlorobenzene at 156° C. and pentafluorochlorobenzene at 115° C.

We have now found that if the refluxing fluorochlorobenzenes are condensed and then led back into the reaction system at a point below the surface of the liquid reaction medium their contact with the components of the system is so much improved that they give unexpectedly higher yields of the more fluorinated compounds. The condensed fluorochlorobenzenes can also, if desired, be pre-heated before being re-introduced into the reaction system, and by this means the temperature of the reaction can be maintained even when pentafluorochlorobenzene, which has the lowest of the boiling points, is being returned.

By this method we have been able to obtain improved yields of $C_6F_4Cl_2$, $C_6F_5Cl$ and $C_6F_6$ from $C_6F_3Cl_3$; of $C_6F_5Cl$ and $C_6F_6$ from $C_6F_4Cl_2$; and of $C_6F_6$ from $C_6F_5Cl$.

Thus according to our invention a process for making fluorine compounds having the general formula $$C_6F_nCl_{6-n}$$

where $n$ is an integer from 4 to 6, by fluorinating a fluorochlorobenzene having fewer fluorine atoms in the molecule by heating it with a dry alkali metal fluoride in a polar non-proton-donating liquid organic reaction medium is characterised in that volatile reaction products after leaving the reaction medium are continuously condensed and continuously returned thereto at a point below its surface.

Any convenient device for returning the reaction products to the reaction medium can be used for example a pump fed from a reservoir connected to a condenser, or a constant head device fed from a condenser. Particularly convenient is a system comprising a reaction vessel fitted with a condenser and dip-pipe, the latter communicating at a point outside the vessel with a constant-head device, such for example as a tube in the form of an S-bend, arranged to be fed with condensed products and exerting sufficient pressure to maintain a continuous flow of condensate through the dip-pipe back into the reaction medium. In this way the returning condensate is preheated as it passes down that part of the dip-pipe within the reaction vessel. From time to time products can be fractionated out of the system and collected as desired, and fresh quantities of the fluorochlorobenzene that is undergoing fluorination added to the system. Reaction temperatures are generally within the range 150° C. to 250° C. and preferably 200° C. to 230° C.

The process also provides an interesting and useful method of separating the ortho and meta isomers of tetrafluorodichlorobenzene. The ortho isomer fluorinates more readily than the meta, hence any unchanged $C_6F_4Cl_2$ remaining in the reaction vessel is richer in the meta isomer. It is possible by this means to effect an over 98% separation of the meta isomer; this is particularly useful since the isomers do not separate by fractional distillation of gas-chromatography, and the meta isomer is a convenient starting point for the preparation of aromatic fluorine compounds.

The invention is illustrated by the following examples of which the second also illustrates the separation of the meta isomer of $C_6F_4Cl_2$.

Example 1

A straight-walled, round-bottom flask fitted with stirrer, reflux condenser, dropping funnel, and a recirculating device fed from the condenser and communicating with a dip-pipe having its bottom end about five inches below the level of liquid in the flask was charged with 1.5 litres of tetramethylene sulphone and 350 g. of dry powdered potassium fluoride. The contents of the flask were heated to 220° C. and 160 g. of trifluorotrichlorobenzene slowly added. Condensed products and unchanged trifluorotrichlorobenzene were continuously returned to the reaction system through the dip-pipe over a period of 6 hours. At the end of this time a mixture of tetrafluorodichlorobenzene, pentafluorochlorobenzene and hexafluorobenzene was distilled out of the system and then a further 50 g. of trifluorotrichlorobenzene slowly added and the reaction carried on as before. When 400 g. in all of trifluorotrichlorobenzene had been added over about 60 hours the reaction mixture was finally distilled and the combined distillates fractionated to give:

| | G. |
|---|---|
| Hexafluorobenzene | 10 |
| Pentafluorochlorobenzene | 80 |
| Tetrafluorodichlorobenzene | 190 |
| Unchanged trifluorotrichlorobenzene | 70 |

Example 2

A straight-walled, round-bottom flask fitted with stirrer, reflux condenser, dropping funnel, and a recirculating device fed from the condenser and communicating with a dip-pipe having its bottom end about five inches below the level of liquid in the flask was charged with 1.5 litres of tetramethylene sulphone and 300 g. of dry powdered potassium fluoride. The contents of the flask were heated to 220° C. and 150 g. of tetrafluorodichlorobenzene (approximately 20% by weight of ortho isomer and 80% of meta isomer) slowly added. Condensed products and unchanged tetrafluorodichlorobenzene were continuously returned to the reaction system through the dip-pipe over a period of 6 hours. At the end of this time a mixture of pentafluorochlorobenzene and hexafluorobenzene were distilled out of the system and then a further 50 g. of tetrafluorodichlorobenzene slowly added and the reaction carried on as before. When 400 g. in all of tetrafluorodichlorobenzene had been added over about 60 hours the reaction mixture was finally distilled and the combined distillates fractionated to give:

|   | G. |
|---|---|
| Hexafluorobenzene | 20 |
| Pentafluorochlorobenzene | 207 |
| Unchanged tetrafluorodichlorobenzene | 104 |

The isomer distribution in the 104 g. of tetrafluorodichlorobenzene was found to be approximately 1% of ortho and 99% of meta by weight.

Example 3

Into a reaction flask similar to that described in Example 1 were charged 1.5 litres of tetramethylene sulphone and 250 g. of dry powdered potassium fluoride. The contents of the flask were heated to 220° C. and 90 g. of pentafluorochlorobenzene slowly added. The pentafluorochlorobenzene refluxed vigorously and was returned to the system through the dip-pipe. The temperature of the part of the condenser column above the take-off point for the recirculating device was held at a level that allowed hexafluorobenzene to distil out of the reaction system as it was formed. Further quantities of pentafluorochlorobenzene were added over five days and amounted to 500 g. in all. Finally the reaction mixture was distilled and the combined distillates fractionated to yield:

|   | G. |
|---|---|
| Hexafluorobenzene | 226 |
| Unchanged pentafluorochlorobenzene | 205 |

Example 4

The experiment described in Example 3 was repeated using the same quantities of tetramethylene sulphone and dry, powdered potassium fluoride but this time the reaction temperature was 230° C. The higher temperature restricted the weight of pentafluorochlorobenzene initially added, but the higher reaction rate due to the higher temperature enabled more pentafluorochlorobenzene to be added during the reaction. In all 700 g. of pentafluorochlorobenzene were added over five days. Finally the reaction mixture was distilled and the combined distillates fractionated to yield:

|   | G. |
|---|---|
| Hexafluorobenzene | 320 |
| Unchanged pentafluorochlorobenzene | 280 |

What we claim is:

1. In a process for making fluorine compounds having the general formula $C_6F_nCl_{6-n}$, where $n$ is an integer from 4 to 6, by fluorinating a fluorochlorobenzene having fewer fluorine atoms in a molecule by refluxing it at 150° C. to 250° C. with a dry alkali metal fluoride in a polar, non-proton-donating, liquid, organic reaction medium, selected from the group consisting of tetramethylene sulphone, dimethyl sulfoxide, dimethyl formamide, demethyl acetamide, and molten phthalic anhydride, the improvement characterized in that volatile products after leaving the reaction medium are continuously condensed and continuously returned thereto at a point below the surface of said liquid organic reaction medium.

2. A process as claimed in claim 1 in which the alkali metal fluoride is potassium fluoride.

3. A process as claimed in claim 1 in which the fluorochlorobenzene having fewer fluorine atoms in the molecule is trifluorotrichlorobenzene and the reaction temperature is from 200° C. to 230° C., and the reaction medium is tetramethylene sulphone.

4. A process as claimed in claim 1 in which the fluorochlorobenzene having fewer fluorine atoms in the molecule is tetrafluorodichlorobenzene and the reaction temperature is from 200° C. to 230° C. and the reaction medium is tetramethylene sulphone.

5. A process as claimed in claim 4 adapted to isolate the meta isomer of tetrafluorodichlorobenzene in that the fluorochlorobenzene having fewer fluorine atoms in the molecule is tetrafluorodichlorobenzene in the form of a its ortho and meta isomers and the liquid phase in the reaction vessel remaining after said tetrafluorodichlorobenzene has been fluorinated to yield pentafluorochlorobenzene and hexafluorobenzene is fractionated to yield said meta isomer.

6. A process as claimed in claim 1 in which the fluorochlorobenzene having fewer fluorine atoms in the molecule is pentafluorochlorobenzene and the reaction temperature is from 200° C. to 230° C. and the reaction medium is tetramethylene sulphone.

References Cited

UNITED STATES PATENTS

| 3,277,192 | 10/1966 | Fielding | 260—650 |
| 3,312,746 | 4/1967 | Fielding | 260—650 |
| 3,287,425 | 11/1966 | Maynard | 260—653.3 |

FOREIGN PATENTS

| 970,746 | 9/1964 | Great Britain. |

BERNARD HELFIN, *Primary Examiner.*

LEON ZITVER, *Examiner.*

N. J. KING, H. MARS, *Assistant Examiners.*